TRAFFIC MEASUREMENT APPARATUS

Filed Jan. 11, 1960

3 Sheets-Sheet 1

INVENTOR
D. H. BARNES
BY
James W. Falk
ATTORNEY

July 30, 1963 D. H. BARNES 3,099,819

TRAFFIC MEASUREMENT APPARATUS

Filed Jan. 11, 1960 3 Sheets-Sheet 2

INVENTOR
D. H. BARNES

BY [signature]

ATTORNEY

July 30, 1963 D. H. BARNES 3,099,819

TRAFFIC MEASUREMENT APPARATUS

Filed Jan. 11, 1960 3 Sheets-Sheet 3

| CELL | NON-STORAGE | STORAGE |
|---|---|---|
| BISTABLE DEVICE | RESET | SET |
| TRANSISTOR Q1 | OFF | ON |
| TRANSISTOR Q2 | ON | OFF |
| OUTPUT "0" | +1 | -13 |
| OUTPUT "1" | -13 | +1 |

INVENTOR
D. H. BARNES
BY [signature]
ATTORNEY

United States Patent Office 3,099,819
Patented July 30, 1963

3,099,819

TRAFFIC MEASUREMENT APPARATUS

Douglas H. Barnes, Mountainside, N.J., assignor to Bell Telephone Laboratories, Incorporated, New York, N.Y., a corporation of New York Filed Jan. 11, 1960, Ser. No. 1,602
29 Claims. (Cl. 340—172.5)

Figures 1, 5:
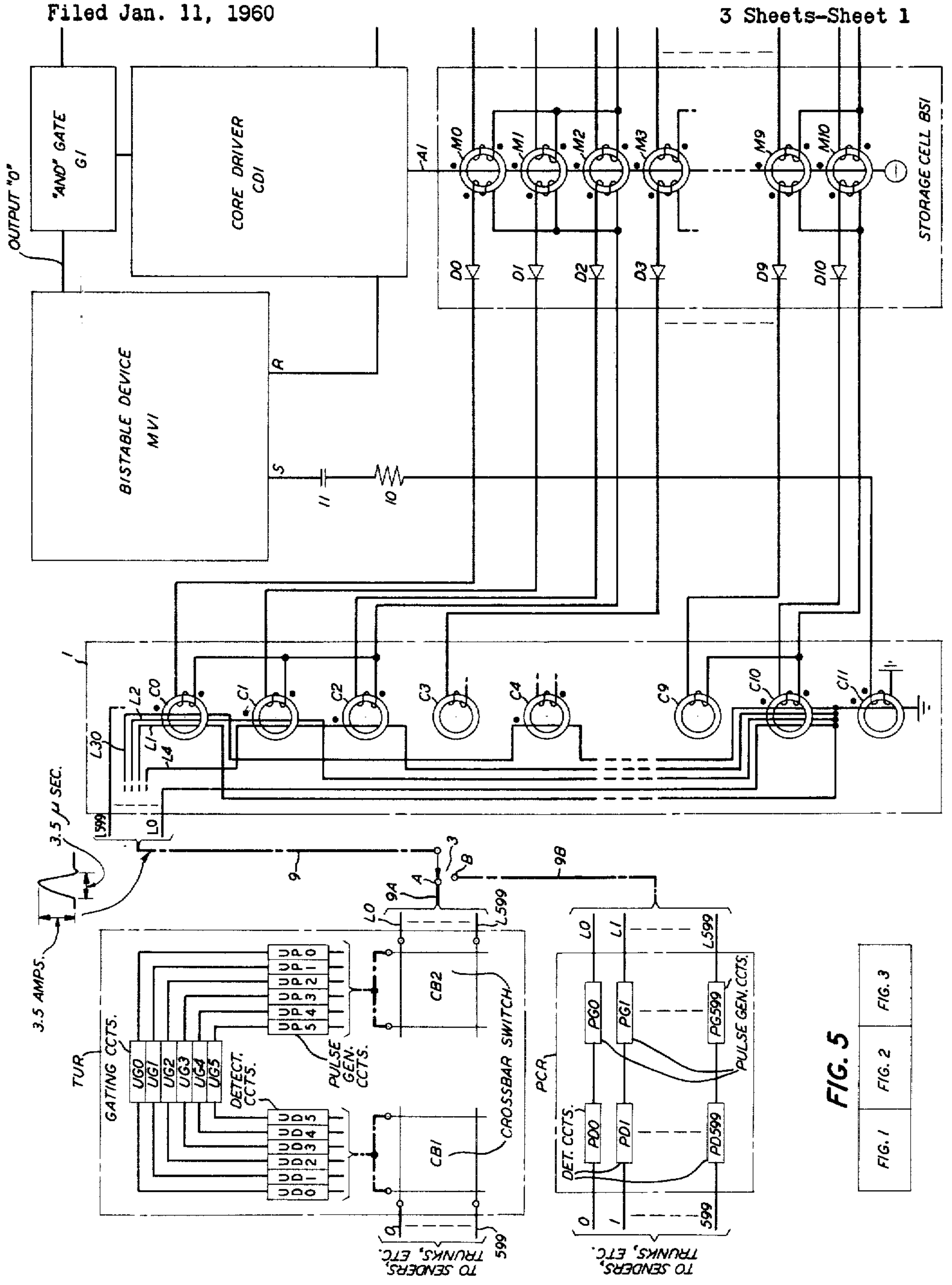

This invention relates generally to traffic measurement apparatus and more particularly to improvements in traffic measurement apparatus for accumulating statistical data with respect to telephone, or like, systems.

In the telephone industry, it is a constant aim of telephone companies to provide optimum service consistent with economy of operation. To achieve this aim, telephone companies regularly conduct traffic studies to ascertain the adequacy or inadequacy of existing telephone exchanges with respect to the amount of traffic to be supported thereby. Such periodic traffic studies are necessary as the amount of traffic supported by a particular telephone exchange does not remain constant but varies between peak traffic conditions and low traffic conditions according to the interaction of many traffic affecting variations, i.e., growth or decay trends; differences among classes of services; weather changes; seasons of the year, e.g., holidays; days of the week, e.g., a weekday as against a Saturday or Sunday, and particular hours thereof; and numerous other systematic and random causes. For example, if a particular telephone exchange serves predominantly business concerns, a peak traffic condition is realized during the working hours and a low traffic condition is realized during the evening and early morning hours of a day. Conversely, if the particular telephone exchange serves predominantly individual subscribers, i.e., residences, peak traffic conditions are realized during the early evening hours while a low traffic condition is realized during the daylight and early morning hours of a day. Accordingly, it is often necessary to add to or subtract units of telephone equipment within a telephone exchange to accommodate for long term growth or decay tendencies of the traffic to be supported thereby. In addition, it is also necessary at times to rearrange existing units of telephone equipment or subscriber lines within a telephone exchange to cope with short term variations in traffic to be supported thereby.

Generally, the ideal goal of the telephone company is to achieve a traffic usage figure of 100 percent as regards telephone equipment provided to a particular telephone exchange, i.e., each unit of telephone equipment is in continual use. However, in practice, such goal is unachievable as the percentage usage of telephone equipments does not remain constant but rather rapidly fluctuates according to the traffic conditions being supported thereby at each particular instant. Accordingly, to provide economical operation of a telephone exchange consistent with optimum service, various units of telephone equipment are rearranged, subtracted from or added to the telephone exchange to provide a traffic usage figure for a particular period of time as close to 100 percent as is practical. By periodic measurements of traffic conditions existing at a particular period of time, management can conduct traffic studies to anticipate the expected traffic condition of a particular telephone exchange and provide sufficient equipments for a support thereof. In this manner, a necessary minimum amount of telephone equipments need be provided to each telephone exchange. Accordingly, an over-all economy of operation for a central office location is attained by providing that particular units of telephone equipments be allotted between the individual telephone exchanges located therein as needed. Further, by being able to anticipate traffic conditions for each period of time, such units of telephone equipments may be previously allotted to a particular telephone exchange whereby an optimum service is provided to the subscribers.

Present day traffic measurement apparatuses which have supplanted manual-visual methods of accumulating statistical data for such telephone traffic studies have not proven adequate. Such equipments are, on the whole, overly bulky and susceptible to error. Normal practice heretofore has been to connect at certain key points within a telephone exchange mechanical counting means for accumulating statistical data. These counters are read by human agents and the traffic usage figure of a particular unit of equipment, i.e., the number of seizures per unit of time, or other parameters of traffic measurement determined by a subtraction process. Another practice employed for the accumulation of statistical data consists in the photographing of either the particular units of telephone equipment being measured or indicators individually associated therewith and noting the conditions of the particular units of telephone equipment and indicators, respectively. The shortcomings of each of these methods are obvious as the statistical data thereby accumulated is of no use until considerable time and energy has been expended in compiling, interpreting and summarizing such data into basic units of traffic measurement. The effort required to drive the basic units of traffic measurements necessarily limits the amount of statistical data that can be accumulated and processed. Additional shortcomings lay in the fact that human agents are employed for the indexing of such data which not only increases the cost of the individual traffic study but also provides a major source of error therein.

Therefore, it is a general object of this invention to provide a traffic measurement apparatus for the compilation of statistical data with respect to existing traffic conditions within a telephone exchange with greater accuracy and greater volume than heretofore possible.

It is another object of this invention to provide an improved traffic measurement apparatus which is simple, economical and compact in arrangement.

It is still another object of this invention to provide an all-electronic traffic measurement apparatus to eliminate the necessity of providing human agents for the interpretation and summarization of statistical data.

It is a further object of this invention to provide a traffic measurement apparatus for the compilation of statistical data in such form as to be directly processable by automatic data processing machines.

These and other objects of my invention are achieved by the provision of a buffer storage unit as a constituent element of a traffic measurement apparatus which is operative to receive and temporarily store statistical data in form directly processable by automatic data processing machines at a faster rate than that rate at which such data is directed therefrom for recording on a final storage medium. Such statistical data is initially accumulated by means of monitoring circuits which are operative to generate an indication upon the appearance of a predetermined traffic condition at a particular unit of telephone equipment; each indication is peculiarly identified with a particular unit of telephone equipment. The monitoring method employed in a telephone exchange is determined by the particular type of statistical data which is desired with respect thereto. For example, to compile statistical data for the determination of traffic density or percentage usage of a particular unit of telephone equipment, it is necessary that each unit of telephone equipment be monitored periodically or on a fixed basis to ascertain the presence or absence of the predetermined traffic thereat. By assuming that a traffic condition which is present at the instant of sampling exists for the period between successive samplings, then each indication generated by the monitoring circuit is indicative of a precise period of usage of the particular unit of telephone equipment being measured. By controlling the sampling rate, indications are provided by the monitoring circuits peculiarly identified with each unit of telephone equipment being measured in basic units of traffic measurements. On the other hand, if the traffic survey requires statistical data with respect to the total number of seizures as distinguished from percentage usage, it is necessary that the monitoring circuits provide an indication only upon the initial appearance of the predetermined condition at the particular unit of telephone equipment. Accordingly, monitoring circuits of the latter type operate on random basis to provide indications peculiarly identified with each unit of telephone equipment only upon a change thereby to the predetermined traffic condition.

Indications thus generated by the monitoring circuits and peculiarly identified with each of the units of telephone equipment being monitored are directed to an encoder unit. The encoder unit operates to identify each indication directed thereto and provides a binary notation designating the particular unit of telephone equipment peculiar to each indication. Accordingly, the encoder unit provides a binary code notation upon each appearance of the predetermined traffic condition at the particular unit of telephone equipment to be recorded as such on the final storage medium for direct processing by automatic data processing equipments.

Each binary notation is directed from the encoder unit to the first storage cell of the buffer storage unit wherein it is stored. The buffer storage unit is comprised of a plurality of storage cells; each storage cell is composed of a plurality of storage elements to store in parallel a binary code notation designating either a period of usage or a particular seizure of the particular unit of telephone equipment identified thereby. Included within the buffer storage unit is control logic circuitry for providing an asynchronous operation thereto whereby each binary code notation directed from the encoder unit to the first storage cell is automatically transferred through intermediate storage cells to a last vacant storage cell. In effect, the buffer storage unit is a "walking storage" which automatically shifts each binary notation along a group of tandemly or successively arranged storage cells. The storage condition of each storage cell effectively controls the logic circuitry such that a binary code notation is directed from one storage cell to a next succeeding storage cell only upon the latter being in a nonstorage or vacant condition. The control logic circuit comprises driver or transfer circuits associated with each storage cell in the buffer storage units, each driver circuit being controlled by the next succeeding storage cell relative thereto to transfer the binary notations stored within the associated storage cell only upon the next succeeding cell being placed in a nonstorage or vacant condition. Each driver circuit is further controlled by the preceding storage cell, to be operative only upon a binary code notation having been transferred therefrom to the associated storage cell.

Accordingly, binary code notations directed to the buffer storage unit on either a random or fixed basis from the encoder unit are directed therethrough to the last storage cell therein in a nonstorage condition. Each binary code notation is maintained within the buffer storage unit in a nonmutilated condition and directed in turn successively to the last storage cell of the buffer storage unit.

Associated with the last storage cell of the buffer storage unit is a serial reader apparatus. The serial reader apparatus serially directs the binary notation stored in the last storage cell for recording on the final storage medium. The serial reader apparatus is controlled by the control logic circuits of the buffer storage unit to be inoperative during such time that the last storage cell is in a nonstorage condition and, to avoid mutilation of statistical data, while a binary notation is being transferred to the last storage cell of the buffer storage unit. However, upon the completion of transfer of binary notation to the last storage cell, the serial reader apparatus is enabled to serially direct the binary notation for recording on the final storage medium which is available for processing by automatic data processing equipment.

Accordingly, traffic measurement apparatuses which embody the principles of my invention are operative to provide that statistical data directed from monitoring circuits for recording on a final storage medium be stored for a period of time at least sufficient to insure an avoidance of mutilation thereof if the rate at which such data is accumulated temporarily exceeds the rate at which such data is able to be recorded on the final storage medium. The buffer storage unit acting as a temporary storage device, therefore, effectively provides an apparent rate of recording of statistical data on the final storage medium equal to either the random or fixed rate at which such data is being accumulated by the monitoring circuits. Such effect is achieved due to the smoothing or buffering action of the buffer storage unit in accumulating a backlog of statistical data during periods of high traffic density and providing such data at a proper rate for the recording thereof in an unmutilated condition on the final storage medium during periods of low traffic density.

In systems wherein a magnetic tape is to be provided as the final storage medium, it is evident that the rate at which statistical data can be recorded thereon is related to the rate at which it is desired to finally process such data. Similarly, if the statistical data is to be presented as perforations along a ribbon or tape, it is evident that the maximum rate at which statistical data can be recorded is limited to the rate at which such data is processable by the mechanical punching means. Therefore, in traffic measurement apparatus now known in the art, the maximum rate of accumulation of statistical data is necessarily limited to the rate at which such data is to be recorded on the final storage medium; an accumulation of statistical data in excess of such rate would result in a mutilation thereof and provide false traffic measurements. In the case of statistical data accumulated on a fixed basis, the rate of which such data is directed to the final storage medium is positively controlled to avoid the danger of mutilation by providing that the statistical data be supplied at a rate lower than or equal to the rate of recording thereof on the final storage medium. However, in the accumulation of statistical data on a random basis, the rate at which such data is accumulated cannot be positively controlled if a true picture of traffic conditions is to be obtained. It is evident that if statistical data is directed immediately for recording from the monitoring circuits while statistical data previously received is in the process of being recorded on the final storage medium, a mutilation of both signals, i.e., the signal being received and the signal being recorded, results. By the provision of a buffer storage unit according to the teachings of my invention, the danger of mutilation of statistical data is very much reduced. The rate of accumulation of statistical data is no longer limited by the rate at which statistical data is recorded on the final storage medium but rather at the much faster rate at which such data can be stored in the buffer storage unit. Accordingly, the danger of mutilation of statistical data is present only if statistical data is directed from the monitoring circuits at a rate faster than the storing rate of the buffer storage unit. It is evident, therefore, that the traffic measurement apparatus according to the principles of my invention is not only operative to accumulate statistical data in greater volume and less in variance wtih existing conditions within the telephone exchange than heretofore possible by known traffic measurement apparatus but, also, to present such data in a form directly processable by automatic data processing equipment without the need of intercession of human agents.

A feature of this invention relates to the provision of a monitoring circuit operative on either a fixed or a random basis for determining the existence of a predetermined condition at each of a plurality of units of telephone equipment under survey and for directing statistical data with respect thereto to the buffer storage unit.

Another feature of this invention, therefore, relates to the provision of a buffer storage unit comprising a plurality of tandemly arranged storage cells, which unit is operative to store statistical data at a rate faster than that rate at which such data can be recorded on a final storage medium. Accordingly, statistical data accumulated by the monitoring circuit is stored in the buffer storage unit in an unmutilatable condition until such time as it is to be directed for recording on the final storage medium.

Still another feature of this invention relates to the provision of an encoder unit as part of the monitoring circuit for directing statistical data in the form of binary code notations for storage in the buffer storage unit.

A further feature of this invention relates to the provision of logic circuitry to provide an asynchronous operation to the buffer storage unit whereby each binary code notation directed from the encoder unit is transferred along successive ones to the last one of the tandemly arranged storage cells in a nonstorage condition.

A still further feature of this invention relates to the provision of means for inhibiting the control logic circuitry during a transferring of the binary code notations along successive ones of the tandemly arranged storage cells comprising the buffer storage unit to avoid a mutilation of the statistical data. The control logic circuitry is, therefore, operative to effect a transfer of statistical data from a storage cell only upon the transfer thereto from a preceding storage cell having been completed and a determination of the next successive storage cell being in a nonstorage condition.

Still another feature of this invention relates to the provision of a serial reader apparatus for serially directing each binary code notation stored in the last one of the tandemly arranged storage cells comprising the buffer storage unit for recording on the final storage medium. Upon a binary code notation having been directed from the last storage cell, the logic circuitry is operative to transfer each binary code notation stored in the buffer storage unit to the next successive one of the tandemly arranged storage cells.

An additional feature of this invention relates to the provision of control means for inhibiting the operation of the serial reader apparatus while the last storage cell of the buffer storage unit is in a nonstorage condition or while a binary code notation is being transferred thereto.

Figure 2:
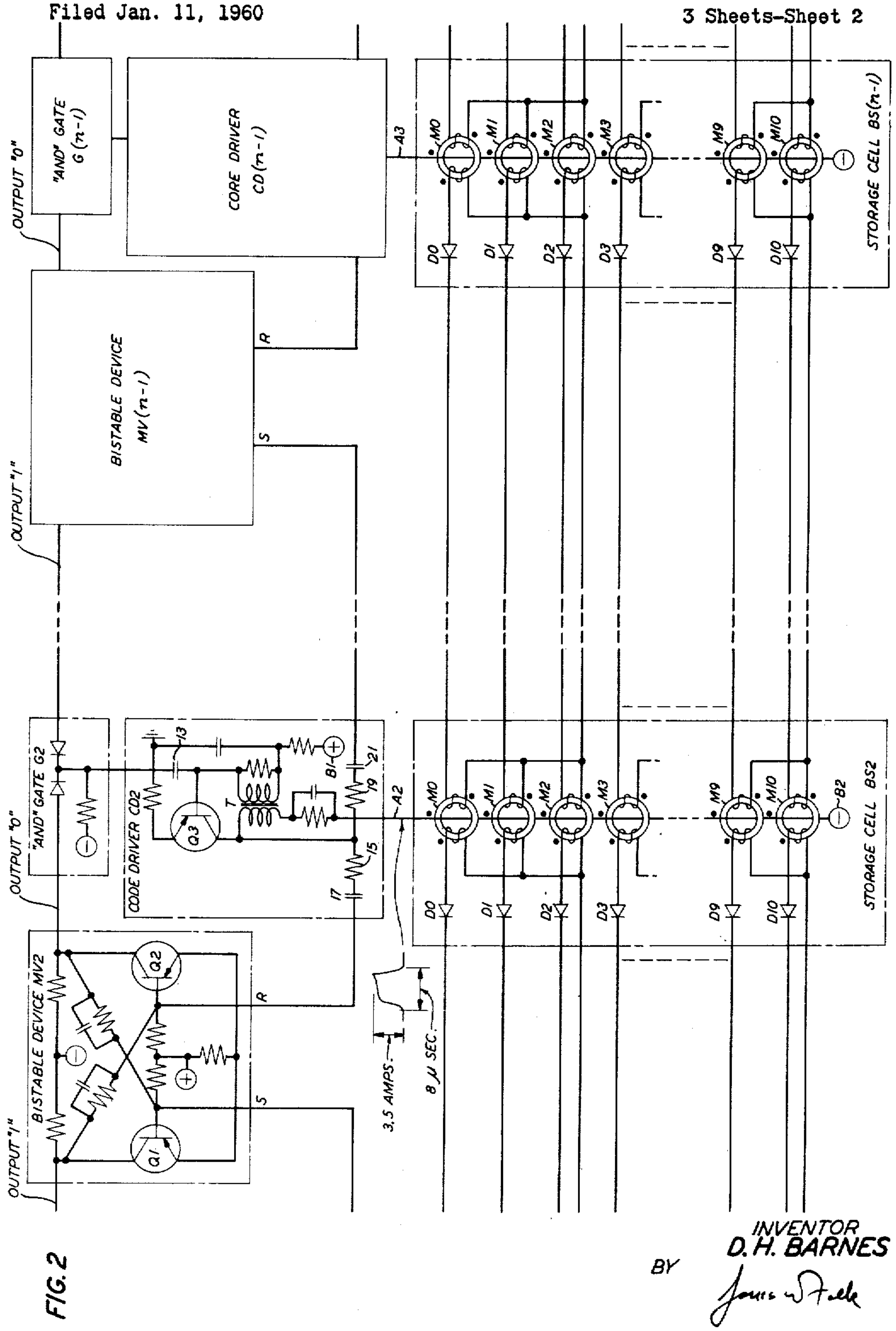
Figures 3, 4:
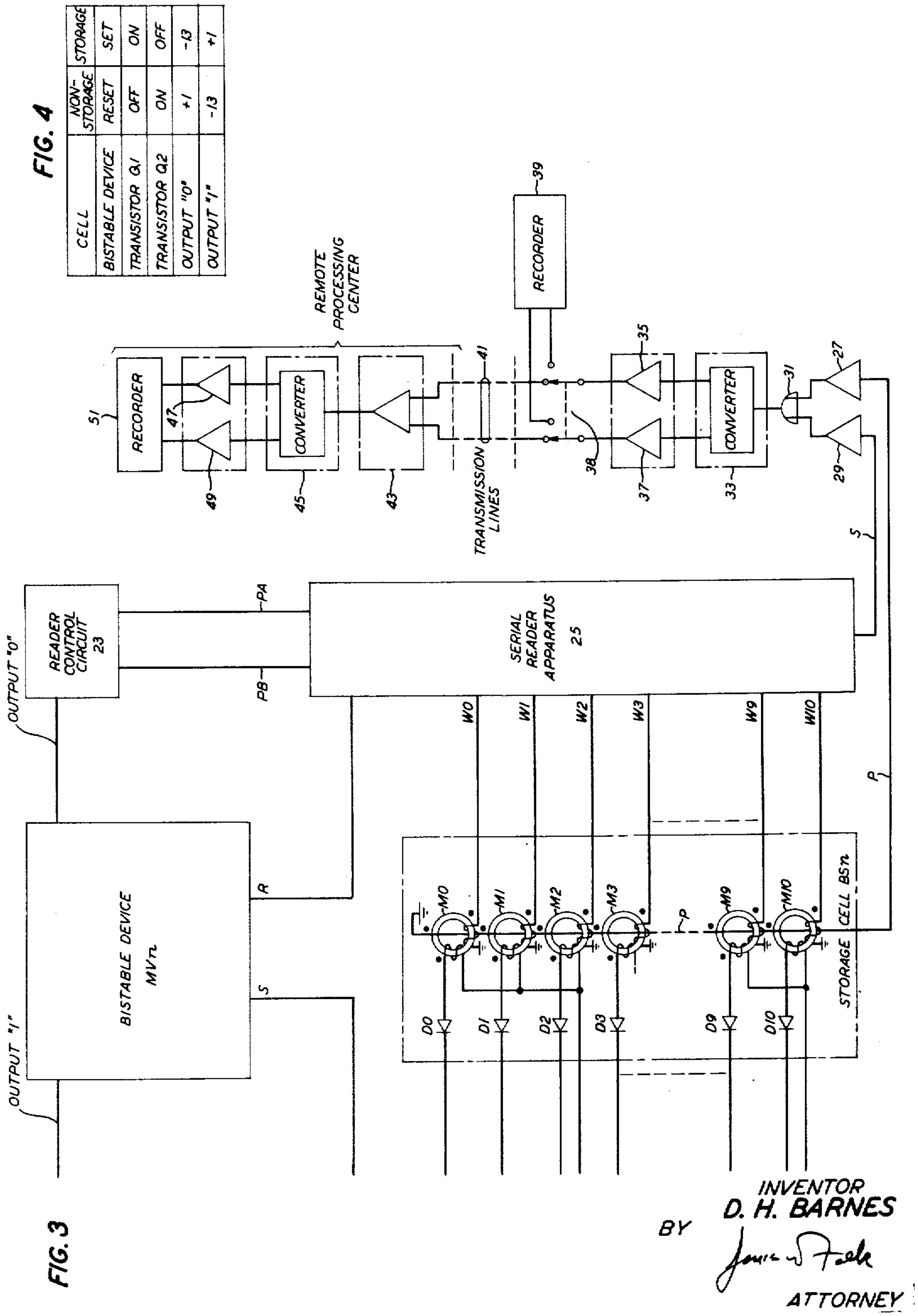

Additional objects and features will become apparent upon a consideration of a description herein set forth in conjunction with FIGS. 1, 2 and 3 arranged as shown in the key diagram of FIG. 5, which figures illustrate a preferred embodiment of a traffic measurement apparatus in accordance with my invention; FIG. 4 is an operational chart to facilitate an understanding of the logic circuitry by which an asynchronous operation is provided to the buffer storage unit of my invention.

The illustrative embodiment of a traffic measurement apparatus in accordance with my invention hereinafter to be described may be conveniently considered as consisting of three portions: a monitoring circuit operative on either a fixed or random basis and including an encoder unit for providing statistical data in the form of binary code notations, each designating the appearance of a predetermined traffic condition at a particular one of a group of units of telephone equipment being monitored, to the first storage cell of a buffer storage unit; a buffer storage unit comprising a plurality of storage cells for receiving and temporarily storing the output of the encoder unit and including control logic circuitry to provide an asynchronous operation thereto whereby each binary code notation in turn is directed to and stored in the last storage cell thereof; and a serial reader apparatus for recording in turn the binary code notations stored in the last storage cell of the buffer storage unit on a final storage medium.

Referring now to FIGS. 1, 2 and 3, there is shown a traffic measurement apparatus embodying the principles of my invention for monitoring traffic conditions at each of six hundred units of telephone equipment. Such telephone equipment may be, for example, the sleeve leads of trunk connections, senders, registers or any unit of telephone equipment for which a traffic study may be desired. It is to be understood, however, that a traffic measurement apparatus of the type herein described may be adapted to monitor a greater or a lesser number of units of telephone equipment without departing from the spirit and scope of my invention.

A monitoring circuit comprising a traffic usage register TUR and a peg count register PCR is shown in FIG. 1 to illustrate methods by which statistical data may be accumulated on either a fixed basis or a random basis, respectively, for telephone traffic studies. The traffic usage register TUR is adapted to provide a monitoring of each of the six hundred units of telephone equipment on a fixed basis for accumulating statistical data for traffic usage or density studies. On the other hand, the peg count register PCR may be of a conventional type and adapted to provide a monitoring of each of the six hundred units of telephone equipment on a random basis for accumulating statistical data with respect to individual seizures thereof. As the traffic usage register TUR and the peg count register PCR do not constitute a part of my invention, they are shown in skeletonized form to exemplify the versatility of a traffic measurement apparatus embodying the principles of my invention. A more complete description of a traffic usage register TUR of the type illustrated may be had by reference to the Lamneck-Wichman patent application Serial No. 1,604, filed on even date herewith.

The function of the monitoring circuit comprising the traffic usage register TUR and the peg count register PCR is to provide an indication peculiarly identifying a particular unit of telephone equipment being monitored which is supporting a predetermined traffic condition wherein a unit of equipment may represent a multiplicity of switching equipments. The monitor circuit is connected to the encoder unit 1 through the group of leads 9 which contains six hundred leads L0 through L599 corresponding one to each of the six hundred units of telephone equipment being monitored. Upon the existence of a predetermined condition at a particular one of the six hundred units of telephone equipment, the monitoring circuit is operative to provide a pulse indication along that one of the leads L0 through L599 corresponding to the particular unit of telephone equipment. Accordingly, each current pulse directed from the monitoring circuit is recognizable at the encoder unit 1 as identifying the particular unit of telephone equipment corresponding to that one of the leads L0 through L599 along which such pulse indication is directed.

As illustrated in FIG. 1, the particular mode of operation of the monitoring circuit on either a fixed or a random basis is controlled by a two-position multicontact switch 3. The traffic usage register TUR and the peg count register PCR are each provided with six hundred output terminals corresponding one to each of the units of telephone equipment to be monitored. The two-position switch 3 is operative to connect each of the leads L0 through L599 contained in the group of leads 9 to an output terminal of either the traffic usage register TUR or the peg count register PCR along a similarly designated lead in the group of leads 9A at the terminal A or along a similarly designated lead in the group of leads 9B at the terminal B, respectively.

The traffic usage register TUR of the monitoring circuit comprises a pair of crossbar switches CB1 and CB2 of the type described in the A. J. Busch Patent 2,585,904, issued February 19, 1952, which pair is adapted for synchronous operation. Each of the crossbar switches CB1 and CB2 may advantageously contain ten select positions and ten hold positions to provide for one hundred cross point connections, each crosspoint connection including six contact members. Each of the six hundred units of telephone equipment to be monitored is connected at the input terminal of the monitoring circuit to one of the six hundred contact members of the crossbar switch CB1. Corresponding contact members included in each of the crosspoint connections of the crossbar switch CB1 are multipled to the input of one of the detector circuits UD0 through UD5 which are connected in series arrangement with the sequential gating circuits UG0 through UG5, respectively, and the pulse generator circuits UP0 through UP5, respectively. Similarly, corresponding contact members at each of the crosspoint connections of the crossbar switch CB2 are multipled to the outputs of the sequential gating circuits UG0 through UG5, respectively, and provide a connection therethrough upon closure to selected ones of the leads L0 through L599 contained in the group of leads 9A. As the crossbar switches CB1 and CB2 are adapted for synchronous operation, each series arrangement of the detector circuits UD0 through UD5, the sequential gating circuits UG0 through UG5, and the pulse generator circuits UP0 through UP5, respectively, are connected between corresponding contact members of the crosspoint connections in each of the crossbar switches CB1 and CB2 which are successively closed in turn. As six units of telephone equipment are concurrently monitored upon each stepping of the crossbar switches CB1 and CB2, it is possible that a maximum of six indications may be simultaneously provided at the sequential gating circuits UG0 through UG5, respectively. To avoid a mutilation of statistical data, as will hereinafter become evident, the sequential gating circuits UG0 through UG5 are operative to accept indications simultaneously received and to direct them successively in turn to the pulse generator circuits UP0 through UP5. The succession of pulses developed by the pulse generator circuits are then directed through the corresponding contact members of the particular crosspoint connection which is closed in the crossbar switch CB2 and along those of the leads L0 through L599 in the group of leads 9A.

It is evident that the cyclic rate of operation of the traffic usage register TUR can be controlled to provide for the accumulation of statistical data in basic units of traffic measurements. For example, a unit of traffic measurement often used in traffic studies is designated "100 call seconds" or a "CCS" unit and is defined as a single period of usage of 100 seconds duration. By providing a cyclic operation of one-hundred seconds and assuming that a predetermined condition exists for the period of a scan, statistical data can be directly accumulated by the traffic usage register TUR in "CCS" units and total usage or density computed by counting the number of pulse indications received therefrom with respect to each particular unit of telephone equipment.

In traffic studies, statistical data is often required with respect to the number of individual seizures of a particular unit of telephone equipment. The peg count register PCR, therefore, is adapted to provide an indication peculiarly identified with a particular unit of telephone equipment being monitored upon each occurrence of a predetermined condition rather than to provide a measurement of the duration of existence of such condition. An initial appearance of the predetermined condition at the six hundred units of telephone equipment to be monitored is detected by the detector circuits PD0 through PD599, respectively, and an indication thereof directed to the pulse generator circuits PG0 through PG599, respectively. The pulse generator circuits PG0 through PG599 are each connected to one of the leads L0 through L599, respectively, contained in the group of leads 9B. Each of the pulse generator circuits is operative to direct a pulse indication along a corresponding one of the leads L0 through L599 in the group of leads 9B to indicate the initial appearance of the predetermined condition at that unit of telephone equipment corresponding thereto. The indications directed by the peg count register PCR along the leads L0 through L599 contained in a group of leads 9B necessarily appear at a random basis. To provide for a processing of such statistical data by the traffic measurement apparatus hereinafter described, the switch 3 is operated to the contacts B to connect each of the leads L0 through L599 of the group of leads 9B to corresponding ones of the leads L0 through L599 contained in the group of leads 9 whereby statistical data accumulated by the peg count register PCR is directed to the encoder unit.

The encoder unit 1 is basically a translator device of the type often referred to as a "Diamond-ring" translator and disclosed in the H. D. Cahill et al. Patent 2,599,358, issued on June 3, 1952, and the T. L. Dimond Patent 2,614,176, issued on October 14, 1952. The function of the encoder 1 is to convert the statistical data accumulated by the monitoring circuit to a form which is directly processable by automatic data processing equipment. The encoder unit 1 provides such function by encoding a multibit binary code notation including a parity check bit designating a particular unit of telephone equipment upon the appearance of a pulse indication directed from the monitoring circuit along a corresponding one of the leads L0 through L599 in the group of leads 9. As illustrated, the encoder unit 1 comprises an arrangement of twelve transformer cores C0 through C11 wherein each of the leads L0 through L599 in the group of leads 9 is selectively threaded on a single-turn basis through or in by-pass of each of the transformer cores C0 through C11. With respect to each of the transformer cores C0 through C9, each of the leads L0 through L599 is threaded in accordance with an equivalent reflected binary or Gray code notation of a decimal number which has been arbitrarily assigned to a unit of telephone equipment corresponding to such lead. To provide for parity checking, the leads L0 through L599 are selectively threaded through the transformer core C10 so as to provide that each binary code notation including the parity bit directed from the encoder unit 1 contains an odd number of binary "1's."

The remaining transformer coil C11, which provides for directing an indication to logic circuitry associated with the buffer storage unit, is threaded by each of the leads L0 through L599 of the group of leads 9 directed to the encoder unit 1. For example, a threading of one of the transformer cores C0 through C10 is indicative of a binary "1" in the information bit slot in the binary code notation to which the particular transformer core corresponds; a by-passing of one of the transformer cores C0 through C10 is indicative of a binary "0" in the particular information bit slot in the binary code notation to which the particular transformer core corresponds. As fully disclosed in the Fredericks-Wichman patent application, Serial No. 1,603, filed on even date herewith and hereinafter described, the transformer core C11 is adapted to provide for sufficient delay in the operation of the logic circuitry associated with the buffer storage unit to avoid a mutilation of the binary code notation upon a storage thereof in the first storage cell BS1. During the current build-up of a pulse indication along a particular one of the leads L0 through L599 in the group of leads 9, a clockwise magnetic flux is induced in the transformer cores C0 through C11 through which the particular lead is threaded. For example, the appearance of a pulse indication along the lead L30 in the group of leads 9 induces a clockwise magnetic flux in only the transformer cores C0, C4, C10 and C11.

Each of the transformer cores C0 through C10 is provided with an output winding which is connected through one of the isolation diodes D0 through D10 to the input windings of the magnetic cores M0 through M10, respectively, of the first storage cell BS1 of the buffer storage unit. The output winding of the transformer core C11 is wound oppositely with respect to the output windings provided to the remaining transformer cores C0 through C10 and, rather than being connected to the input winding of a corresponding magnetic core in the buffer storage cell BS1, is connected through the resistor 10 and capacitor 11 to the set terminal "S" of the bistable device MV1 associated with the first storage cell BS1. The clockwise magnetic flux induced in selected ones of the transformer cores, i.e., transformer cores CO, C4 and C10, during the current build-up of a pulse indication, as illustrated, along one of the leads L0 through L599 results in the appearance of a positive voltage at the dotted terminals of the output windings provided thereto. The direction of resultant induced current flow, therefore, in each of the output windings of the transformer cores C0, C4 and C10 is from the dotted terminals thereof and through the input windings of the corresponding magnetic cores M0, M4 and M10, respectively, of the storage cell BS1 in the low impedance direction of the isolation diodes D0, D4 and D10. This induced current flowing through the input windings of the magnetic cores M0, M4 and M10 of the first storage cell BS1 induces a counterclockwise magnetic flux of sufficient magnitude to set each magnetic core in a manner well known in the art. Accordingly, a binary code notation designating that unit of telephone equipment corresponding to that one of the leads L0 through L599 in a group of leads 9 along which the pulse indication appears is encoded by the encoder unit 1 and simultaneously stored in the first storage cell BS1. However, during the current decrease of the pulse indication along a particular one of the leads L0 through L599 of the group of leads 9, a counterclockwise magnetic flux is induced in the transformer cores C0, C4, C10 and C11 which results in the appearance of a negative voltage at the dotted terminals of the output windings provided thereto. The "kick-back" currents now induced in the output windings of the magnetic cores C0, C4 and C10 are effectively inhibited by the isolation diodes D0, D4 and D10, respectively, of the storage cell BS1 in a well-known manner. However, the appearance of a negative voltage at the dotted terminal of the output winding of the transformer core C11 provides a triggering pulse at the set terminal "S" of the bistable device MV1 whereby the operation of the logic circuitry associated with the buffer storage unit is initiated after having been delayed sufficiently following the setting of the magnetic cores C0, C4 and C10 to insure a nonmutilation of the binary code notation stored in the storage cell BS1.

The buffer storage unit for temporarily storing the binary code notations directed from the encoder unit 1 comprises a plurality of storage cells BS1 through BSN. The storage cells BS1 through BSN of the buffer storage unit and the logic circuitry provided thereto are identical with the exception of the last storage cell BSN, as is hereinafter described. Referring specifically to the storage cell BS2 as representative of any number of storage cells interposed between the first buffer storage cell BS1 and the last buffer storage cell BSN, a series of magnetic cores M0 through M10 having square-loop characteristics are provided for storing an eleven-bit binary code notation. Each of the magnetic cores M0 through M10 is provided with an input winding which is connected through one of the isolation diodes D0 through D10, respectively, to the output winding of the next preceding storage cell, e.g., storage cell BS1. Each of the isolation diodes D0 through D10 is poled to present a low impedance to current flowing through the respective input windings for setting the magnetic cores M0 through M10, respectively. An advance winding A2 is threaded on a single-turn basis through each of the magnetic cores M0 through M10. Upon the appearance of an advance pulse, the advance winding A2 is operative to produce a clockwise magnetic flux in the magnetic cores M0 through M10 causing the previously set cores to be reset whereby the binary code notation stored in the buffer storage cell BS2 is transferred in parallel to the next successive storage cell, e.g., storage cell BS3, in a manner well known in the art.

Advance pulses are supplied along the advance winding A2 by a core driver CD2 which may advantageously comprise a transistor blocking oscillator of conventional type. The advance pulse provided by the core driver CD2 should be of sufficient amplitude and duration to insure a complete transfer of the binary code notation between the storage cell BS2 and the storage cell BS3. For purposes of description, this advance pulse has been illustrated as being of the order of 3.5 amperes and having a duration of eight microseconds. However, it should be understood that the characteristics of the advance pulse developed by the core driver CD2 may be varied to satisfy the particular requirements of the buffer storage unit employed for the practising of my invention. The core driver CD2 is shown as comprising the p-n-p transistor device Q3 which is provided with regenerative feedback through the pulse transformer T. A complete understanding of the operation of a blocking oscillator of a type employable as the core driver CD2 may be had by reference to an article by J. A. Narud and M. R. Aaron entitled, "Analysis and Design of a Transistor Blocking Oscillator Including Inherent Nonlinearities" appearing in The Bell System Technical Journal of May 1959, vol. XXXVIII, Number 3. The transistor device Q3 is normally maintained in a reverse-biased or nonoperative condition due to the maintenance of a ground potential at the emitter electrode thereof through a resistor to ground and the connection of the base electrode thereof to the positive voltage source B1. An operating potential is provided to the collector electrode of the transistor device Q3 from the negative voltage source B2 along the advance winding A2 as threaded through the magnetic cores M0 through M10 and the primary winding of the pulse transformer T.

An asynchronous operation is provided to the buffer storage unit by logic circuitry comprising the bistable devices MV1 through MVN and the AND gates G1–GN each of which is associated with one of the storage cells BS1 through BSN, respectively. The bistable devices MV1 through MVN function essentially as memory devices to indicate the storage condition of the associated one of the buffer storage cells BS1 through BSN, respectively. As each of the bistable devices MV1 through MVN may advantageously comprise a conventional-type transistor bistable circuit similar to the Eccles-Jordan type circuit, a detailed description thereof is not deemed necessary. A description of a transistor bistable circuit of the type herein employable may be had by reference to Section 10.6.1, pages 324–338, of "Transistor Circuit Engineering," edited by Richard F. Shea and published by John Wiley and Sons, Inc., November 1957.

Referring to the bistable device MV2 as representative of a memory device particularly associated with each of the storage cells BS1 through BSN, a pair of p-n-p transistor devices Q1 and Q2 is arranged for bistable operation; each of the bistable devices MV1 through MVN is provided with an output terminal "1" and an output terminal "0" which are electrically integral with the collector electrodes of the transistor devices Q1 and Q2, respectively. Each of the bistable devices MV1 through MVN is adapted to be set or reset by the application of a pulse of negative polarity to the set terminal "S" and the reset terminal "R" which are electrically integral with the base electrodes of the transistor devices Q1 and Q2, respectively. As stated above, the operational state of the bistable devices MV1 through MVN is indicative of the storage condition of the associated one of the storage cells BS1 through BSN, respectively. More particularly, a storage condition of a particular one of the storage cells BS1 through BSN is indicated by the bistable device associated therewith being in a set condition. Conversely, a nonstorage condition of a particular one of the storage cells BS1 through BSN is indicated by the bistable device associated therewith being in a reset condition. To facilitate an understanding of the logic circuitry by which an asynchronous operation is provided to the buffer storage unit, an operational chart is illustrated in FIG. 4 setting forth exemplary voltages which appear at the output terminal "1" and the output terminal "0" during each operational state of the bistable devices MV1 through MVN.

The output terminal "0" of the bistable device MV2 is connected to one input terminal of the AND gate G2 which is associated with the storage cell BS2; the output terminal "1" of the bistable device MV2 is connected to one input terminal of the AND gate G1 which is associated with the next preceding storage cell BS1. The other input terminal of the AND gate G2 is connected to the output terminal "1" of the next successive storage cell BS3.

The AND gate G2 comprising the diodes D11 and D12 is, therefore, controlled by the operational states of the bistable devices MV2 and MV3. Referring to the operational chart of FIG. 4, the output of the AND gate G2 is effectively clamped at plus one volt except in that period during which the following conditions exist: (1) the bistable device MV2 is in a set condition indicating the storage of a binary code notation in the storage cell BS2 and (2) the bistable device MV3 is in a reset condition indicating the availability of the storage cell BS3 for receiving the binary code notation. When such conditions coexist, the output voltage level appearing at each of the output terminal "0" and the output terminal "1" of the bistable devices MV2 and MV3, respectively, is minus thirteen volts. Accordingly, due to the characteristic operation of the AND gate G2, the output voltage appearing therefrom changes from plus one volt to minus thirteen volts immediately upon the occurrence of the latest in time of the above-enumerated conditions. For example, if either a binary code notation is not presently stored in the storage cell BS2, i.e., the bistable device MV2 is in a reset condition, or a binary code notation is presently stored in the storage cell BS3, i.e., the bistable device MV3 is in a set condition, the output voltage of the AND gate G2 remains at the clamped voltage of plus one volt. However, upon a change in both of the above-listed conditions, the output voltage of the AND gate G2 abruptly changes to minus thirteen volts. This change in voltage is reflected through the capacitor 13 and is sufficient to forward bias the emitter-base junction of the transistor device Q3 of the core driver CD2 whereby an advance pulse is directed along the advance winding A2. The appearance of a pulse along the advance winding A2 is operative to reset each of the magnetic cores M0 through M10 of the storage cell BS2 which are in a set condition and transfers the binary code notation stored therein to corresponding ones of the magnetic cores M0 through M10 of the next successive storage cell BS3.

Upon a binary code notation having been transferred from the storage cell BS2 to the next successive storage cell BS3, the core driver CD2 is operative to reset the bistable device MV2 and to set the bistable device MV3. The collector electrode of the transistor device Q3 of the core driver CD2 is connected to the reset terminal "R" of the bistable device MV2 through the resistor 15 and capacitor 17 and, also, to the set terminal "S" of the bistable device MV3 through the resistor 19 and the capacitor 21. By providing transistor devices Q1, Q2 and Q3 of the same conductivity type, a transfer of the operational state of the bistable devices MV2 and MV3 is affected during the turn-off period of the core driver CD2, hereinafter more fully described. A transfer of the operational state of each of the bistable devices MV2 operates to condition the logic circuitry associated with the buffer storage unit. For example, the resetting of the bistable device MV2 now indicates a nonstorage condition of the storage cell BS2 to allow for a transferring thereto of a binary code notation if one is presently stored in the next preceding storage cell BS1. Accordingly, if the storage cell BS1 is in a storage condition, the setting of the bistable device MV2 by the core driver CD2 is operative to enable the AND gate G1 whereupon an activating signal is transferred by the capacitor 13 to the base electrode of the transistor Q3 and the core driver CD1 triggered. However, if the storage cell BS1 is in a nonstorage condition, the resetting of the bistable device MV2 by the core driver CD2 is effective only to condition the AND gate G1 so that upon a transferring of a binary code notation thereto and an accompanying setting of the bistable device MV1, as hereinafter described, the AND gate G1 is enabled and the core driver CD1 triggered to immediately transfer such binary code notation to the storage cell BS2.

Similarly, the setting of the bistable device MV3 now indicates a storage condition of the storage cell BS3 to inhibit a transferring thereto of another binary code notation from the next preceding storage cell BS2. Accordingly, if the storage cell BS4 is in a storage condition, i.e., the bistable device MV4 is in a set condition, a setting of the bistable device MV3 is effective only to condition the AND gate G3. AND gate G3 is, therefore, enabled and the core driver CD3 triggered upon the storage cell BS4 entering into a nonstorage condition and the accompanying resetting of the bistable device MV4 associated therewith by the operation of the core driver CD4. If the storage cell BS4 is in a nonstorage condition, i.e., the bistable device MV4 is reset, the AND gate G3 is immediately enabled upon the setting of the bistable device MV3 and the core driver CD3 triggered to transfer the binary code notation stored therein to the storage cell BS4.

To more fully understand the operation of the traffic measurement apparatus embodying the principles of my invention, assume initially that each of the storage cells BS1 through BSN is in a nonstorage condition; the bistable devices MV1 through MVN associated therewith, respectively, are each in a reset condition. Accordingly, each of the AND gates G1 through G(N–1) associated with each of the storage cells BS1 through BS(N–1), respectively, are conditioned but not enabled, i.e., the bistable devices associated with the same storage cell and the next successive storage cell are each in a reset condition. Further assume that one of the leads L0 through L599, e.g., lead L30, has been pulsed to indicate the appearance of a predetermined condition at the particular unit of telephone equipment which corresponds thereto. As the lead L30 is threaded on a single-turn basis only through the transformer cores C0, C4, C10 and C11 of the encoder unit 1, a resultant clockwise magnetic flux is induced in only these transformer cores during the current build-up of the pulse directed therealong. Due to transformer action, a positive voltage appears at the dotted terminal of each of the output windings of the transformer cores C0, C4, C10 and C11. Disregarding the transformer core C11 for the present, the direction of induced current flow in each of the output windings of the transformer cores C0, C4 and C10, therefore, is from the dotted terminals thereof and through the input windings provided to the corresponding magnetic cores M0, M4 and M10, respectively, of the storage cell BS1 in the low impedance direction of the isolation diodes D0, D4 and D10, respectively. The induced current flowing through each of the input windings of the magnetic cores M0, M4 and M10 of the first storage cell BS1 induces a counterclockwise flux of sufficient magnitude to set each core in a manner well known in the art. Accordingly, a binary code notation, i.e., the reflected binary code equivalent of the decimal number thirty arbitrarily assigned to the unit of telephone equipment corresponding to the lead L30, is stored in the buffer storage cell BS1. In a similar manner, a binary code notation designating each particular one of the units of telephone equipment being monitored may be generated and stored in turn in the storage cell BS1 by the monitoring circuits.

Upon the storage cell BS1 entering into a storage condition, the logic circuitry associated with the buffer storage unit becomes operative to transfer the binary code notation stored in the first buffer storage cell BS1 to the last one of the storage cells BS2 through BSN which is in a nonstorage condition. To avoid a mutilation of statistical data, the logic circuitry associated with the buffer storage unit is delayed in operation with respect to each of the storage cells BS1 through BSN until the transfer of each binary code notation thereto has been completed. With respect to the storage cell BS1, a delayed operation of the logic circuitry is controlled by the transformer core C11 of the encoder unit 1. The transformer core C11 is distinguishable from the transformer cores C0 through C10 of the encoder unit 1 in that (1) each of the leads L0 through L599 is threaded therethrough on a single-turn basis, and (2) the output winding thereon is wound in reverse to the windings provided to the remaining transformer cores C0 through C11. The output winding of the transformer core C11 is connected through the resistor 10 and capacitor 11 to the set terminal "S" of the bistable device MV1 associated with the first buffer storage cell BS1.

Accordingly, during the current build-up of the pulse appearing along the lead L30, a positive voltage appears at the dotted terminal of the output windings of the transformer core C11. As indicated above, the bistable device MV1 is in a reset condition during the storage of a binary code notation in the storage cell BS1, i.e., the transistor device Q2 is conductive and the transistor device Q1 is nonconductive. Accordingly, as the transistor device Q1 is of a p-n-p conductivity type, a positive pulse developed at the dotted terminal of the output winding of the transformer core C11 during the current build-up of the pulse along the lead L30 when directed through the resistor 10 and capacitor 11 to the set terminal "S" of the bistable device MV1, i.e., the base electrode of the transistor device Q1, is effective only to further reverse bias the transistor device Q1. However, upon the decrease in the current pulse along the lead L30, i.e., subsequent to the storage of a binary code notation in the storage cell BS1, a resultant counterclockwise flux is induced in each of the transformer cores C0, C4, C10 and C11 and a voltage pulse of opposite polarity is developed at the dotted terminal of each of the output windings thereof with accompanying "kick-back" currents. As is well known in the art, the isolation diodes D0, D4 and D10 are operative to prevent the mutilation of a binary code notation stored in the storage cell BS1 by "kick-back" currents. The negative voltage pulse developed at the dotted terminal of the output winding of the transformer core C11 and directed through the resistor 10 and capacitor 11 to the set terminal "S" is of sufficient magnitude when applied to the base electrode of transistor device Q1 to forward bias the emitter-base junction thereof and transfer the operational state of the bistable device MV1.

It should be remembered that the storage cell BS2 is at this time in a nonstorage condition and, therefore, the bistable device MV2 associated therewith is in a reset condition. However, the bistable device MV1 being set, as hereinabove described, the AND gate G1 is enabled and the voltage level appearing at the output thereof rapidly decreases from plus one volt to minus thirteen volts. This abrupt negative change of voltage level is reflected through the capacitor 13 and is of sufficient magnitude to forward bias the emitter-base junction of the transistor device Q3 of the core driver CD1, the emitter electrode of which is maintained at ground potential.

The initiation of collector current flow through the transistor device Q3 results in the build-up of magnetic flux in the pulse transformer of the core driver CD1 and positive regeneration whereby the transistor device Q3 rapidly saturates in a manner well known in the art and described in the above-identified article by J. A. Narud et al. The operation of the core driver CD1 is productive of a current pulse appearing along the advance winding A1 which is threaded on a single-turn basis through the magnetic cores M0 through M10 of the storage cell BS1 and a decrease in the negative voltage level appearing at the collector electrode of the transistor device Q3. Accordingly, a positive pulse is directed through the capacitors 17 and 21 to reset terminal "R," i.e., the base electrode of the transistor device Q2, of the bistable device MV1 and the set terminal "S," i.e., the base electrode of the transistor device Q1, of the bistable device MV2. At this time, each of the transistor devices Q2 and Q1 of the bistable devices MV1 and MV2, respectively, are nonconducting and, as each are of the p-n-p conductivity type, the appearance of a positive pulse to the base electrode of each serves to further reverse bias the respective emitter-base junctions. Accordingly, the operational states of neither the bistable devices MV1 or MV2 are transferred during the turn-on period or continued operation of the core driver CD1.

During the current build-up of the pulse directed along the advance winding A1 upon the operation of the core driver CD1, a clockwise magnetic flux is induced in each of the magnetic cores M0 through M10 of the storage cell BS1 of sufficient magnitude to reset the magnetic cores M0, M4 and M10 in a manner well known in the art. In the process of resetting the magnetic cores M0, M4 and M10, a positive voltage appears at the dotted terminals of the respective output windings thereof to provide an induced current through the input windings of the corresponding magnetic cores M0, M4 and M10 of the storage cell BS2 in the low impedance direction of the diodes D0, D4 and D10, respectively. The current flowing through the input windings of each of the magnetic cores M0, M4 and M10 of the storage cell BS2 induces a counterclockwise magnetic flux therein of sufficient magnitude to set each magnetic core.

The current pulse directed along the advance winding A1 by the core driver CD1 must be of sufficient magnitude and duration to insure a complete transfer of the binary code notation to the storage cell BS2. To further insure a complete transfer of each binary code notation, the output windings of the magnetic cores M0 through M10 of the storage cell BS1 are provided with a greater number of turns than the input windings of the corresponding magnetic cores M0 through M10 of the storage cell BS2.

Upon the transistor device Q3 having saturated, positive regeneration in the core driver CD1, of necessity, ceases and the transistor device Q3 reverts to a nonconductive operation. Upon the transistor device Q3 becoming nonconductive, there is a rapid increase in the negative voltage level appearing at the collector electrode thereof and a corresponding decrease in magnitude of current flow along the advance winding A1. This rapid increase in the voltage level at the collector electrode of the transistor device Q3 is reflected as a negative pulse through each of the capacitors 17 and 21 to the reset terminal "R" and the set terminal "S" of the bistable devices MV1 and MV2, respectively. As each of the p-n-p transistor devices Q2 and Q1 of the bistable devices MV1 and MV2, respectively, are nonconductive at this time, the application of a negative pulse to the reset terminal "R" and the set terminal "S" of the bistable devices MV1 and MV2, respectively, is effective to simultaneously transfer the operational states thereof. Therefore, subsequent to the transfer of the binary code notation from the first storage cell BS1 to the second storage cell BS2, the logic circuitry provided to the buffer storage unit is normalized with respect to the storage cell BS1, i.e., the bistable device MV1 is reset. With the exception of the storage cell BS1, each normalization with respect to a particular one of the remaining storage cells BS2 through BSN conditions the logic circuitry to provide a transfer to the particular storage cell of a binary code notation immediately upon the storage thereof in the next preceding storage cell. The logic circuitry does not control the storage of binary code notations in the storage cell BS1. Rather, a binary code notation is stored in the storage cell BS1 immediately upon the processing of statistical data by the encoder unit 1 due to the manner in which they are coupled.

Assume, for the moment, that the storage cells BS3 through BSN are in a storage condition and a binary code notation has been transferred from the storage cell BS1 to the storage cell BS2. The accompanying setting of the bistable device MV2 is not effective to enable the AND gate G2 due to the bistable device MV3 associated with the storage cell BS3 being in a set condition, i.e., plus one volt appears at the output terminal "1" thereof. Accordingly, core driver CD2 is untriggered and bistable device MV2 remains in a set condition. Similarly, while the bistable device MV2 is in a set condition, the storing of a subsequent binary code notation in the storage cell BS1 and the accompanying setting of the bistable device MV1 by the transformer core C11, as hereinabove described, are not effective to enable the AND gate G1 to trigger the core driver CD1. Accordingly, as long as the bistable device MV2 remains in a set condition, a binary code notation cannot be transferred from the storage cell BS1 to the storage cell BS2.

Conversely, if a binary code notation has been transferred to the storage cell BS2 and the storage cell BS3 is in a nonstorage condition, the binary code notation is immediately transferred to the storage cell BS3. Prior to such transfer, the bistable device MV3 associated with the storage cell BS3 is in a reset condition, i.e., minus thirteen volts appear at the output terminal "1" thereof, to condition but not enable the AND gate G2. Upon a binary code notation having been transferred to the storage cell BS2 and the accompanying setting of the bistable device MV2, as hereinabove described, the AND gate G2 is enabled and the core driver CD2 triggered to immediately transfer the same binary code notation to the next successive storage cell, i.e., storage cell BS3. Therefore, it is evident that each binary code notation directed from the encoder unit 1 is automatically transferred in an unmutilated condition along successive ones of storage cells BS1 through BSN in turn under the control of the logic circuitry.

The logic circuitry provided to the last storage cell BSN differs from that provided to the other storage cells BS1 through BS(N–1) in that a core driver is not associated therewith. In addition, the bistable device MVN provided as a memory unit to indicate the storage condition of the storage cell BSN is controlled in a manner dissimilar to that hereinabove described with respect to the remaining bistable devices MV1 through MV(N–1). In a manner similar to that hereinabove described, the bistable device MVN is set by the core driver MV(N–1) to indicate a storage condition in storage cell BSN and inhibit the core driver CD(N–1). While the bistable device MVN is in a set condition, an enabling potential is provided from the output terminal "0" thereof to the input of the reader control circuit 23. During an enabled condition, the reader control circuit 23 is operative to initiate and maintain the operation of the serial reader apparatus 25. The reader control circuit 23 and the serial reader apparatus 25 may advantageously be of the type disclosed in the copending Fredericks-Lamneck patent application, Serial No. 1,739, filed on even date herewith.

In the apparatus as disclosed in the above-identified Fredericks-Lamneck patent application, the reader control circuit 23 comprises an astable circuit which, when enabled, furnishes high current stepping pulses alternately along the leads PA and PB to the serial reader apparatus 25. The serial reader apparatus 25 comprises a two-phase magnetic core stepping switch or shift register arrangement consisting of twenty-six magnetic cores paired into thirteen steps. Eleven of these steps into which the serial reader apparatus 25 is arranged correspond to the magnetic cores M0 through M10 of the storage cell BSN while the remaining two steps, one at the beginning and the other at the end of a reading sequence, provide time "spaces" which bracket each binary code notation and provide separation between successively recorded binary code notations on the final storage medium. The magnetic cores in one phase of the two-phase magnetic core stepping switch comprising the serial reader apparatus 25 are connected to corresponding ones of the magnetic cores M0 through M10 of the storage cell BSN by the drive windings W0 through W10, respectively. This phase of the magnetic core stepping switch is adapted to be shifted by a current pulse appearing along the lead PB whereupon a current flow is induced in turn along each of the drive windings W0 through W10. The current flow thus induced in each of the drive windings W0 through W10 is productive of a clockwise magnetic flux sufficient to reset in turn those of the magnetic cores M0 through M10, respectively, which are in a set condition, e.g., M0, M4 and M10. Accordingly, the binary code notation which is stored in the storage cell BSN is directed in serial form along the output winding P which is threaded through each of the magnetic cores M0 through M10 of the storage cell BSN on a single-turn basis. The voltage pulse thus induced across the output winding P upon the resetting of those magnetic cores M0 through M10 of the storage cell BSN which are in a set condition, i.e., M0, M4 and M10, is directed to the input of the amplifier 27 whereby they are amplified and directed to the converter circuit 33 through the OR gate 31.

The other phase of the magnetic core stepping switch disclosed in the above-identified Frederick-Lamneck patent application comprising the serial reader apparatus 25 is adapted to be shifted by a current pulse appearing along the lead PA. The serial reader apparatus 25 is further operative to provide an output pulse along the lead S to the input of the amplifier 29 upon the shifting of the magnetic cores of the second phase of the magnetic core stepping switch contained in the eleven steps corresponding to the magnetic cores M0 through M10 of the storage cell BSN. Accordingly, input pulses are directed from the serial reader apparatus 25 to the amplifier 29 along the lead S periodically or in a definite sequence, which pulses advantageously serve as synchronizing pulses for recording the statistical data on the final storage medium in a self-clocking "nonreturn-to-zero" basis. The amplifiers herein illustrated by conventional symbolisms may advantageously be of the type described in the above-identified Fredericks-Lamneck patent application, and are effective to suppress noise pulses due to magnetic core shuttling appearing on the output winding P upon a binary code notation being transferred to the last storage cell BSN.

Upon the serial reader apparatus 25 having serially directed the binary code notation stored in the last storage cell BSN and subsequent to the time "spaces" also provided thereby, it is further operative to direct a negative pulse to the reset terminal "R" of the bistable device MVN of sufficient magnitude to transfer the operation state thereof. A resetting of the bistable device MVN is indicative of the storage cell BSN being in a nonstorage condition. If a binary code notation is presently stored in the buffer storage cell BS(N–1), i.e., the bistable device MV(N–1) is set, a resetting of the bistable device MVN enables the AND gate G(N–1) and the core driver CD(N–1) is triggered, as hereinabove described; the binary code notation is thereupon transferred to the storage cell BSN and the bistable device MVN is set by the core driver CD(N–1) to again initiate the above-described operation. If, however, the storage cell BS(N–1) is in a nonstorage condition, a resetting of the bistable device MVN serves only to condition AND gate G(N–1).

Therefore, due to the temporary storage function of the buffer storage unit, successive binary code notations are serially directed from the storage cell BSN by the serial reader apparatus 25 at the proper recording rate thereof on a final storage medium notwithstanding that the rate of accumulation of the statistical data, whether on a fixed or a random basis, exceeds such recording rate for short time intervals. Moreover, if the rate of accumulation of statistical data, either on a fixed or a random basis, does not exceed such recording rate, successive binary code notations are immediately transferred through the buffer storage unit to the storage cell BSN and processed by the serial reader apparatus 25. Accordingly, a temporary storage of statistical data is only affected by the buffer storage unit if the rate at which statistical data is received and processed by the encoder unit 1 is greater than the processing rate of the serial reader apparatus 25. Therefore, a backlog of statistical data is accumulated and stored in the buffer storage unit during short periods of high traffic density to be later processed during periods of low traffic density when the accumulation rate thereof is smaller than the processing rate of the serial reader apparatus 25. The amount of backlog which can be provided is a function of the number of storage cells included in the buffer storage unit. Therefore, the rate of accumulation of statistical data is no longer limited by the actual recording rate thereof on a final storage medium.

The effect of the buffer storage unit is to provide an apparent recording rate of the statistical data on the final storage medium equal to the varying rate at which such data is being accumulated. For example, if ten buffer storage cells are provided in the buffer storage unit, the apparent rate of recording on the final storage medium would be increased by a factor of eighty-five (85). It is evident that such apparent recording rate has a maximum limit equal to the processing rate of the encoder unit 1 plus the transfer time of the storage cell BS1, i.e., approximately ten microseconds, and a minimum limit equal to the actual recording rate of the statistical data. As the permissible rate of accumulation of statistical data is now equal to the maximum limit of the apparent recording rate thereof on the final storage medium, the danger of mutilation of statistical data, especially such data accumulated on a random basis, is materially reduced. In other words, a mutilation of statistical data occurs only if the rate of accumulation thereexceeds the maximum limit of the apparent recording rate rather than the actual recording rate thereof on the final storage medium, the latter being the permissible rate of accumulation for traffic measurement apparatus now known in the art.

The recording arrangement of the above-identified Fredericks-Lamneck patent application is operative to record the statistical data directed thereto on a "nonreturn-to-zero" basis. As shown therein, the outputs of the amplifiers 27 and 29 are directed to the single input of the converter 33 through the OR gate 31. From the description hereinabove set forth, an output pulse from the amplifier 27 corresponds to the appearance of a binary "1" in a particular information bit slot of the binary code notation stored in the storage cell BSN and the appearance of an output pulse from the amplifier 29 corresponds to a sync pulse developed upon the stepping of the other phase of the magnetic core stepping switch of the serial reader apparatus 25. The converter circuit 33 comprises a bistable circuit which is adapted to transfer operational states upon each application thereto of a pulse directed through the OR gate 31. Upon each successive transfer operation of the converter circuit 33, output pulses are directed therefrom alternately in turn to the writing amplifiers 35 and 37. The writing amplifiers 35 and 37 are connectable by the switch 38 to either a recording 39 or a remote processing center via the transmission lines 41. As illustrated, the remote processing center comprises a receiving amplifier 43 responsive to the pulses directed along the transmission lines 41. The output of the receiving amplifier 43 is connected to the single input of a converter circuit 45 which comprises a bistable circuit adapted to transfer operational states upon each application of an input pulse thereto. Output pulses are directed from the converter circuit 45 alternately in turn to the writing amplifiers 47 and 49 which are in turn connected to the recording device 51. The recording devices 39 and 51 are operative to provide a recording of each binary code notation directed through the buffer storage unit and processed by the serial reader apparatus 25 on a magnetic tape on a self-clocking "nonreturn-to-zero" basis as well known in the art.

It is to be understood that the above-described arrangements are illustrative of the application of the principles of my invention. Numerous other arrangements may be devised by those skilled in the art without departing from the spirit and scope of my invention.

What is claimed is:

1. In a traffic measurement apparatus, monitoring means for randomly providing indications peculiarly identified with each of a pluralty of units of equipment to be measured, temporary storage means connected to said monitoring means and operative to receive said indications at a first maximum rate, said storage means comprising a plurality of tandemly arranged storage cells and means for transferring each of said indications so received to the last one of said storage cells, recording means including a serial reader connected to said last one of said storage cells for serially recording each of said indications directed through said storage means, said recording means being operative at a second maximum rate, said second maximum rate being less than said first maximum rate, and means connecting said serial reader to said transferring means for providing that each of said indications is directed to said last storage cell at said second maximum rate.

2. In a traffic measurement apparatus, monitoring means for providing an indication peculiar to the appearance of a predetermined electrical condition of each of a plurality of units to be measured, means comprising a plurality of tandemly arranged storage cells for temporarily storing each of said indications to provided, means for directing each of said indications to the first of said tandemly arranged storage cells, control logic means connected to said temporary storage means for transferring said indication directed to said first tandemly arranged storage cell to a final one of said tandemly arranged storage cells in a non-storage condition, said control logic means including means for transferring an indication stored in one of said tandemly arranged storage cells to the next successive one of said tandemly arranged storage cells responsive to the nonstorage condition of said next successive one of said storage cells, the transfer by said transferring means of an indication from said one storage cell to said next successive storage cell placing said one storage cell in a nonstorage condition, and recording means connected to the last of said tandemly arranged storage cells for recording the indication stored therein on a final storage medium whereby said last tandemly arranged storage cell is placed in a nonstorage condition.

3. A traffic measurement apparatus as set forth in claim 2 wherein said control logic means further includes delay means for inhibiting the operation thereof until such time that said indication has been totally transferred to said one storage cell.

4. A traffic measurement apparatus as set forth in claim 2 wherein said recording means includes serial reader means for serially directing said indication stored in said last of said tandemly arranged storage cells for recording on said final storage medium.

5. In a traffic measurement apparatus, monitoring means for providing an indication peculiar to the appearance of a predetermined electrical condition at each of a plurality of units, buffer storage means comprising a plurality of tandemly arranged storage cells for storing each of said indications so developed, means for storing each of said indications directed from said monitoring means in the first of said tandemly arranged storage cells, control logic means for providing an asynchronous operation to said buffer storage means, said control logic means including first means responsive to said storing means upon one indication having been stored in said first storage cell for transferring said one indication to a final one of said tandemly arranged storage cells in a nonstorage condition, said control logic means further including second means for transferring said one indication stored in said final storage cell to the last of said tandemly arranged storage cells through successive ones of said tandemly arranged storage cells responsive to the nonstorage condition of each successive one of said tandemly arranged storage cells, and means connected to the last of said tandemly arranged storage cells for recording each indication stored therein on a final storage medium whereby said last tandemly arranged storage cell is placed in a nonstorage condition.

6. In a traffic measurement apparatus, monitoring means for providing an indication peculiar to the appearance of a predetermined electrical condition at each of a plurality of units to be measured, buffer storage means comprising a plurality of tandemly arranged storage cells for storing each of said indications so provided, means for directing each of said indications to the first of said tandemly arranged storage cells, said buffer storage means including logic circuit means for providing an asynchronous operation to said buffer storage unit whereby each indication directed to said first storage cell is transferred in turn through successive ones of said tandemly arranged storage cells to the final one of said tandemly arranged storage cells in a nonstorage condition, means connected to the last one of said tandemly arranged storage cells for recording each indication stored therein on a final storage medium, and control means connected to said logic circuit for inhibiting said recording means during that period in which said last one of said tandemly arranged storage cells is in a nonstorage condition.

7. In a traffic measuring apparatus, monitoring means for providing an indication peculiar to the appearance of a predetermined condition at each of a plurality of units to be measured, encoder means for providing a binary code notation peculiarly designating each of said indications so developed, buffer storage means for temporarily storing each of said binary code notations in parallel, said buffer storage means including a plurailty of interconnected storage cells in a tandem arrangement and a plurality of transfer control circuits connected one to each except the last one of said tandemly arranged storage cells, each of said transfer control circuits including means for determining the storage condition of a next successive one of said tandemly arranged storage cells, each of said transfer control circuits further including means operative upon a determination of a nonstorage condition in said next successive storage cell by said determining means for transferring a binary code notation stored in said connected storage cell to said next successive storage cell whereby said connected storage cell enters into a nonstorage condition, means connected to said last storage cell for recording said binary code notation stored in said last storage cell on a final storage medium, and means operative upon said binary code notation having been stored in said last storage cell for initiating the operation of said recording means.

8. In a traffic measurement apparatus, monitoring means for providing binary code indications identifying the appearance of a predetermined condition at each of a plurality of units to be measured, buffer storage means for temporarily storing each of said indications, said buffer storage means including a plurality of tandemly arranged storage cells and a plurality of transfer circuits connected one to each except the last of said tandemly arranged storage cells, a plurality of bistable means for indicating the storage condition of an associated one of said storage cells, a plurality of first means associated one with each except the last of said tandemly arranged storage cells, each of said first means connecting said bistable means indicating the storage condition of said associated one of said storage cells and said bistable means indicating the storage condition of said storage cell next adjacent to said associated one of said storage cells to said transfer circuit connected to said associated one of said storage cells, each of said transfer circuits including means responsive to said connected first means for transferring a binary code notation stored in said connected one of said storage cells to said next adjacent one of said storage cells upon said bistable means indicating said connected storage device being in a storage condition and said next adjacent storage device being in a nonstorage condition, and means for controlling said bistable means for indicating the present storage condition of each of said storage cells.

9. A traffic measurement apparatus as set forth in claim 8 further comprising recording means connected to said last one of said tandemly arranged storage cells and responsive to said bistable device indicating the storage condition of said last one of said tandemly arranged storage cells for recording each binary code notation upon being stored in said last one of said tandemly arranged storage cells.

10. In a buffer storage device for storing statistical data comprising a plurality of storage cells, means for connecting said storage cells in a tandem arrangement whereby statistical data stored in one of said storage cells may be transferred to a next successive one of said storage cells in said tandem arrangement, the first one of said plurality of storage cells including input means for receiving statistical data to be stored, control means for transferring said statistical data along said plurality of tandemly arranged storage cells, said control means including a plurality of transfer means connected one to each of said storage cells, and logic means for determining the operation of said control means, said logic means comprising a plurality of memory devices each individually connected to a corresponding one of said plurality of storage cells for indicating the storage condition thereof, and a plurality of driver means connecting each of said transfer means both to said memory device connected to said storage cell to which said transfer means is connected and to said memory device connected to said storage cell next adjacent therto, each of said driver means being coincidently responsive to each of said connected memory devices for operating said transfer means.

11. A buffer storage device as set forth in claim 10 wherein said driver means comprises coincident gating means.

12. A buffer storage device for storing statistical data comprising a plurality of tandemly arranged storage cells, a plurality of bistable devices each having a first and a second operational state and coupled one to each of said plurality of storage cells, a plurality of transfer means connected one to each of said plurality of storage cells for transferring information stored therein to a next adjacent one of said tandemly arranged storage cells, a plurality of driver means connected one to each of said plurality of transfer means, each of said driver means being concurrently responsive to said bistable device coupled to a same storage cell in said first operational state and said bistable device coupled to said next adjacent storage cell in said second operational state for operating said driver means connected to said one storage cell, and first means for transferring the operational states of said bistable devices coupled to said same storage cell and said next adjacent storage cell upon a completion of operation of said transfer means connected to said one storage cell.

13. A buffer storage unit as set forth in claim 12 wherein said bistable devices and said transfer means include transistor devices of a same conductivity type and wherein said first means includes coupling means connecting the output of said transfer means connected to said one storage cell to each of said bistable devices coupled to said same storage cell and said next adjacent storage cell.

14. A buffer storage device as set forth in claim 12 further comprising means for providing a first operational state to said bistable device coupled to the first of said tandemly arranged storage cells upon information having been stored in said first storage cell.

15. A buffer storage device as set forth in claim 12 further comprising means for recording a binary code notation stored in said last storage cell, said recording means being connected to said last of said tandemly arranged storage cells and responsive to said bistable device coupled thereto in said first operational state.

16. A buffer storage device as set forth in claim 15 further comprising means for providing a second storage state to said bistable device coupled to said last of said tandemly arranged storage cells upon each completed operation of said recording means.

17. A buffer storage unit comprising a plurality of tandemly arranged storage cells, a plurality of memory devices each coupled to one of said plurality of storage cells for storing information as to the storage condition of said storage cell coupled thereto, logic means for providing an asynchronous operation to said plurality of storage cells, said logic circuit including a plurality of transfer circuits connected one to each of said storage cells, each of said transfer circuits including a pulsing circuit and means for comparing information stored in said memory device coupled to a same storage cell and in said memory device coupled to the next successive storage cell, said transfer circuit being operative only upon a determination by said comparing means of a storage condition in said same storage cell and a nonstorage condition in said next successive storage cell, and means for transferring the operative state of said memory device coupled to said same storage cell and said memory device coupled to said next successive storage cell upon each completed operation of said transfer circuit connected to said same storage cell.

18. A buffer storage unit comprising a plurality of tandemly arranged storage cells, logic means for providing an asynchronous operation to said plurality of tandemly arranged storage cells, said logic circuit including a plurality of transfer circuits connected one to each of said tandemly arranged storage cells, a plurality of bistable devices coupled one to each of said storage cells for for storing information as to the storage condition of said coupled storage cell, each of said bistable devices having a first and a second output terminal and a first and a second input terminal, a plurality of gating means coupled one to each of said plurality of storage cells, each of said gating means connecting said second output terminal of said bistable device coupled to said same storage cell and said first output terminal of said bistable device coupled to a next successive one of said tandemly arranged storage cells to said transfer circuit connected to said same storage cell, first means connecting said second input terminal of said bistable device coupled to said same storage cell and said first input terminal of said bistable device coupled to said next successive storage cell to said transfer circuit connected to said same storage cell, said connecting means being operative upon a completed operation of said transfer circuit for transferring the operational states of said bistable devices connected thereto.

19. A buffer storage unit as set forth in claim 18 wherein each of said storage cells comprises a plurality of magnetic core elements each having an input winding and an output winding, said output winding of each of said magnetic cores being connected to the input winding provided to a corresponding magnetic core element in said next successive storage cell; wherein each of said transfer circuits further includes an advance winding threaded through each of said magnetic core elements in said storage cell connected thereto for transferring a binary code notation in parallel from said storage cell to said next successive storage cell upon the appearance of the leading edge of a pulse directed from said pulsing circuit included therewith; and wherein said first means includes capacitive means for providing an enabling pulse to said second input terminal of said bistable memory device and to said first terminal of said bistable memory device coupled to said next successive storage cell upon the trailing edge of said pulse directed along said advance winding.

20. A buffer storage unit comprising a plurality of storage cells, logic means for providing an asynchronous operation to said plurality of storage cells, said logic means including a transfer control circuit coupled one to each of said storage cells, each of said transfer control circuits including a pulsing circuit and a bistable memory device for storing information as to the storage condition of said storage cell coupled thereto, said bistable memory device having a first and a second input terminal and a first and a second output terminal, coincident gating means connected to said second output terminal of said bistable memory device and said first output terminal of the bistable memory device included in said transfer control circuit coupled to said next successive storage cell for enabling said pulsing circuit, first means connected to said second input terminal of said bistable memory device and to said first input terminal of said bistable memory device coupled to said next successive state for transferring the operation state of each of said bistable memory devices upon each completed operation of said pulsing circuit, and means connected to said first input terminal of said bistable device for providing an indication upon said storage cell entering into a storage condition.

21. A buffer storage unit comprising a plurality of tandemly arranged storage cells, read-out means connected to each of said storage cells for transferring a binary code notation from said connected storage cell to a next adjacent one of said storage cells, a plurality of bistable devices each coupled to one of said storage cells for storing information as to the present storage condition of said storage cell coupled thereto, a plurality of comparison means each coupled to a respective one of said read-out means and individually connected between successive ones of said bistable devices for enabling said respective one of said read-out means, and means for transferring the operational condition of each of said bistable devices connected to one of said plurality of comparison means upon a completed operation of said respective one of said read-out means coupled thereto.

22. A buffer storage unit comprising a plurality of tandemly arranged storage cells, each of said storage cells comprising a plurality of storage elements for storing in parallel a multibit binary code notation, transfer control means for transferring each of said binary code notations through successive ones of said tandemly arranged storage cells, first means for determining a storage condition in one of said storage cells, second means for determining a non-storage condition in said next successive one of said storage cells, pulsing means concurrently responsive to said first and second means for providing a current pulse, said transfer means being responsive to said pulsing means during a current build-up of said pulse directed therefrom, and means responsive to said pulsing means during a current decay of said pulse directed therefrom for controlling said first and second means to indicate the present storage condition of said one of said storage cells and said next successive one of said storage cells.

23. A buffer storage unit comprising a plurality of tandemly arranged storage cells, means for providing a binary code notation to said first one of said storage cells, transfer control means for transferring said binary code notation through each of said tandemly arranged storage cells to the last one of said storage cells in a nonstorage condition, said transfer control means including a pulsing circuit for each of said tandemly arranged storage cells but said last one of said storage cells, logic means for controlling the operation of said transfer control means, said logic circuit including first means for determining the related storage conditions of successive ones of said storage cells, said first means being operative upon a determination of a storage condition in one of said storage cells and a nonstorage condition in a next adjacent one of said storage cells for operating said pulsing circuit corresponding to said one storage cell whereby a binary code notation stored in said one storage cell is transferred to the next one of said adjacent storage cells, and recording means connected to said last storage cell for serially recording the binary code notation stored therein.

24. A buffer storage unit comprising a plurality of tandemly arranged storage cells, logic means for providing an asynchronous operation to said plurality of tandemly arranged storage cells, said logic means including a read-out means including a read-out circuit coupled to each of said storage cells for transferring a binary code notation stored in one of said storage cells to a next adjacent one of said storage cells and first means coupled to each of said storage cells for determining a storage condition in said one storage cell and a nonstorage condition in said next adjacent storage cell, said read-out circuit connected to said first means and responsive to said first means upon each determination thereby of the respective storage conditions of said one and said next adjacent storage cells, and means responsive to said read-out circuit upon said binary code notation having been transferred to said next adjacent storage cell for storing information in said first means to indicate a nonstorage condition in said one storage cell and a storage condition in said next adjacent storage cell.

25. A buffer storage unit as set forth in claim 24 wherein said first means comprises a plurality of memory means corresponding one to each of said plurality of tandemly arranged storage cells, said memory means corresponding to said one storage cell and said next adjacent storage cell including a common memory device for indicating the storage condition of said next adjacent storage cell.

26. A buffer storage unit comprising a plurality of tandemly arranged storage cells, each of said storage cells including a plurality of storage elements for storing in parallel a multibit binary code notation, each of said storage elements being provided with an input winding and an output winding, said output winding provided to each of said storage elements in one of said storage cells being connected to said input winding of a corresponding one of said memory elements in a next adjacent one of said storage cells, read-out means connected to each of said storage cells for providing a read-out pulse so determined as to advance a binary code notation stored in said one storage cell to said next adjacent storage cell during the leading edge of said read-out pulse, a plurality of bistable devices corresponding one to each of said storage cells for storing information as to the storage condition of said corresponding storage cell, and means responsive to said read-out means during the trailing edge of said read-out pulse for providing storage information to said bistable devices corresponding to said one storage cell and to said next adjacent storage cell.

27. A buffer storage unit comprising a plurality of tandemly arranged storage cells, logic means for providing an asynchronous operation to said tandemly arranged storage cells, said logic circuitry including a plurality of transfer control means connected one to each but the last one of said tandemly arranged storage cells and a plurality of bistable devices corresponding one to each of said tandemly arranged storage cells for storing information as to the storage condition of said corresponding one of said storage cells, each of said bistable devices having a first and a second output terminal and also a first and a second input terminal, a plurality of comparison means corresponding to each but the last of said storage cells connected between said second output terminal of said bistable device corresponding to the same storage cell and to said first output terminal of said bistable device corresponding to a next adjacent one of said storage cells for operating said transfer control means connected to said same corresponding cell whereby a binary code notation is transferred from said same storage cell to said next adjacent storage cell, a plurality of first means corresponding one to each of said transfer control means connected to said second input terminal of said bistable device corresponding to said same storage cell and to said first input terminal of said bistable device corresponding to the next adjacent storage cell for transferring the operational states of each of said connected bistable devices to indicate the present storage conditions of said same storage cell and said next adjacent storage cell upon each operation of said transfer control means, means connected to said first input of said bistable device corresponding to the first one of said tandemly arranged storage cells for transferring the operational state thereof to indicate the present storage condition of said first one of said storage cells, serial reader means connected to said last one of storage cells for serially recording each binary code notation stored therein, means connected to said second output terminal of said bistable device corresponding to said last storage cell for controlling the operation of said serial reader means, and means connecting said serial reader means to said second input terminal of said bistable device corresponding to said last storage cell for determining the operational state of said connected bistable device to indicate the present storage condition of said last storage cell.

28. In a traffic measurement apparatus, monitoring means for accumulating statistical data, recording means for recording said statistical data, buffer means connecting said monitoring means and said recording means including a plurality of tandemly arranged storage cells each having a storage and a nonstorage condition, the first one of said storage cells being connected to said monitoring means and the last one of said storage cells being connected to said recording means, logic means selectively responsive to the nonstorage condition of said storage cells for transferring said statistical data from said monitoring means to the final one of said tandemly arranged storage cells in a nonstorage condition, means for determining the storage condition of said last one of said storage cells, and means controlled by said determining means for transferring statistical data stored in said last one of said storage cells to said recording means.

29. In a traffic measurement apparatus, monitoring means for providing an indication peculiar to the appearance of a predetermined condition at each of a plurality of units of equipment, means connected to said monitoring means comprising a plurality of tandemly arranged storage cells for temporarily storing each of said indications so developed, control logic means connected to said temporary storage means for transferring each of said indication directed to said temporary storage means to the final one of said plurality of storage cells in a nonstorage condition, means connected to the last one of said tandemly arranged storage cells for recording in turn each of said indications on a final storage medium, and means responsive to said recording means for determining the operation of said control logic means in transferring successive indications in turn to said last one of said tandemly arranged storage cells.

References Cited in the file of this patent

UNITED STATES PATENTS

| | | |
|---|---|---|
| 2,700,148 | McGuigan et al. | Jan. 18, 1955 |
| 2,764,634 | Brooks | Sept. 25, 1956 |
| 2,767,248 | Warman | Oct. 16, 1956 |
| 2,904,636 | McKim et al. | Sept. 15, 1959 |
| 2,921,986 | Boswau | Jan. 19, 1960 |
| 2,922,985 | Crawford | Jan. 26, 1960 |
| 2,931,014 | Buchholz et al. | Mar. 29, 1960 |
| 2,933,622 | Clark | Apr. 19, 1960 |
| 2,956,180 | James | Oct. 11, 1960 |

OTHER REFERENCES

Electronics (Ferrite Memories Simplify Data Telephone Analysis), pp. 68–70.